(12) United States Patent
Raval et al.

(10) Patent No.: US 11,698,860 B2
(45) Date of Patent: Jul. 11, 2023

(54) METHOD, SYSTEM, AND APPARATUS FOR SUPPORTING MULTIPLE ADDRESS SPACES TO FACILITATE DATA MOVEMENT

(71) Applicant: ATI Technologies ULC, Markham (CA)

(72) Inventors: Nippon Raval, Markham (CA); Philip Ng, Toronto (CA); Rostislav S. Dobrin, Toronto (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/135,602

(22) Filed: Dec. 28, 2020

(65) Prior Publication Data

US 2022/0206942 A1    Jun. 30, 2022

(51) Int. Cl.
| | | |
|---|---|---|
| *G06F 12/06* | (2006.01) | |
| *G06F 13/28* | (2006.01) | |
| *G06F 13/42* | (2006.01) | |

(52) U.S. Cl.
CPC ............ *G06F 12/063* (2013.01); *G06F 13/28* (2013.01); *G06F 13/4221* (2013.01); *G06F 2212/206* (2013.01)

(58) Field of Classification Search
None
See application file for complete search history.

(56) References Cited

U.S. PATENT DOCUMENTS

| | | | | |
|---|---|---|---|---|
| 2016/0328333 A1* | 11/2016 | Dong | ........................ | G06F 9/50 |
| 2019/0206017 A1* | 7/2019 | Lin | ........................... | G06T 1/60 |
| 2019/0213707 A1* | 7/2019 | Cooray | ............... | G06F 12/1009 |
| 2020/0142840 A1* | 5/2020 | Iyer | ..................... | G06F 13/1668 |
| 2020/0233814 A1* | 7/2020 | Fargo | .................... | G06F 12/1027 |
| 2021/0056042 A1* | 2/2021 | Arora | ................... | G06F 13/1668 |
| 2021/0064525 A1* | 3/2021 | Tian | ..................... | G06F 12/1081 |
| 2021/0173790 A1* | 6/2021 | Kakaiya | .............. | G06F 12/1009 |
| 2021/0271481 A1* | 9/2021 | Tian | .................... | G06F 13/4221 |
| 2022/0283946 A1* | 9/2022 | Ng | ...................... | G06F 13/4022 |

* cited by examiner

*Primary Examiner* — Henry Tsai
*Assistant Examiner* — Christopher A Bartels (57) ABSTRACT

Methods, systems, and apparatuses provide support for multiple address spaces in order to facilitate data movement. One apparatus includes an input/output memory management unit (IOMMU) comprising: a plurality of memory-mapped input/output (MMIO) registers that map memory address spaces belonging to the IOMMU and at least a second IOMMU; and hardware control logic operative to: synchronize the plurality of MMIO registers of the at least the second IOMMU; receive, from a peripheral component endpoint coupled to the IOMMU, a direct memory access (DMA) request, the DMA request to a memory address space belonging to the at least the second IOMMU; access the plurality of MMIO registers of the IOMMU based on context data of the DMA request; and access, from the IOMMU, a function assigned to the memory address space belonging to the at least the second IOMMU based on the accessed plurality of MMIO registers.

20 Claims, 7 Drawing Sheets

METHOD, SYSTEM, AND APPARATUS FOR SUPPORTING MULTIPLE ADDRESS SPACES TO FACILITATE DATA MOVEMENT

INTRODUCTION

A Direct Memory Access (DMA) data mover device is used to offload software-based copy loops. Offloading is desirable to free up central processing unit (CPU) execution cycles. However, DMA adoption can be limited to specific privileged software, and Input/output (I/O) use cases employing very device-specific interfaces are not forward compatible. Additionally, limitations make user-mode application usage challenging in a non-virtualized environment and extremely difficult in a multi-tenant virtualized environment.

In certain architectures, an input/output memory management unit (IOMMU) processes memory transactions that are routed through a root complex to a system fabric. In a system with multiple root complexes, separate software-visible IOMMUs are required for each root complex. In certain systems, multiple Smart Data Accelerator Interface (SDXI) engines are distributed across multiple sockets, and the SDXI engines are peripheral component endpoints, such as a peripheral component interconnect express (PCIe) endpoint, with interfaces into multiple root complexes and capable of performing multi-address space DMA operations.

In these systems, the SDXI engines can require communicating over a physical channel, which possibly is connected through cable or interconnect, to route the DMA to correct root complex in order to apply appropriate protection and address translation. Such communication would require extra I/O bandwidth overhead and would impact the overall I/O performance of the system. Accordingly, there is a need for SDXI engines to communicate without the cost of a direct physical channel between SDXI engines.

BRIEF DESCRIPTION OF THE DRAWINGS

The implementations will be more readily understood in view of the following description when accompanied by the below figures, wherein like reference numerals represent like elements, and wherein.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, methods, systems, and apparatuses that virtualize peripheral component bus architecture, such as PCIe bus architecture, and IOMMU architecture that turns the peripheral component bus architecture and IOMMU architecture into a multi-context aware architecture in order to provide one or more address translations based on the context. Each multi-context aware IOMMU instance can perform an access check and address translation for a given interface in multi-interface devices, such as a SDXI engine, that can have interfaces into different root complexes. This allows for at least two IOMMU instances to exchange context information and be able to operate on behalf of each other. A grouping of SDXI engines can include a collection of interconnected instances referred to as a function group. Moreover, no assumption is made that each IOMMU context is programmed the same as any other context. Each IOMMU context may all point to same data structures (Device Tables, Page Tables, Ringer Buffers, etc.) or reuse encodings, such as address space identifier (DomainID). Additionally, translation lookaside buffers (TLB) of a multi-context aware IOMMU are enhanced to be tagged with an appropriate context identifier.

An IOMMU extends system architecture by adding support for address translation and system memory access protection on DMA transfers from peripheral devices. An IOMMU also filters and remaps interrupts from peripheral devices. An IOMMU extends the concept of protection domains, which allows each peripheral component endpoint, such as an I/O device, SDXI engine, peripheral component device, and/or a PCIe device, in the system to be assigned to a specific domain and a distinct set of I/O page tables. When an peripheral component endpoint attempts to read or write system memory, the IOMMU intercepts the access, determines the domain to which the device has been assigned, and uses the TLB entries associated with that domain or the I/O page tables associated with that peripheral component endpoint to determine whether the access is to be permitted as well as the actual location in system memory that is to be accessed.

An IOMMU may include support for remote I/O Translation Look-aside Buffer (IOTLB), which is a buffer located in a peripheral device that holds a pre-translated address, such as, for example, a PCIe Address Translation Cache. A trusted peripheral component with IOTLB support can cooperate with the IOMMU to maintain its own cache of address translations, which creates a framework for creating scalable systems with an IOMMU in which peripheral component endpoints may have different usage models and working set sizes.

Major system resources provided by the IOMMU include, among other things, I/O DMA access permission checking and address translation using memory-based translation tables; support for guest translation tables compatible with a long mode page table format, a Device Table that allows peripheral component endpoints to be assigned to specific domains and contains pointers to the peripheral component endpoints' page tables; an interrupt remapping table, which the IOMMU uses to provide permission checking and interrupt remapping for peripheral component endpoints interrupts; a guest virtual APIC mechanism which the IOMMU uses to deliver interrupts to guest VMs; memory-based queues for exchanging command and status information between the IOMMU and one or more system processors; support for a peripheral page request (PPR) log; features to mitigate PPR and Event Log overflow; and support for a hardware-based mechanism for allowing privileged peripheral component endpoints to directly access defining regions of system memory.

In particular, the IOMMU provides address translation and page protection for DMA by peripheral component endpoints rather than memory accesses by the central processing unit (CPU). Further, an IOMMU may provide no direct indication to peripheral component endpoints of a failed translation when processing an untranslated posted request. Systems supported by the IOMMU may consist of a number of processor and device nodes connected to each other by a data fabric such as AMD Infinity Fabric, Data Fabric links or other means. The IOMMU can process memory transactions that are routed through its node in the system fabric. In a system with multiple links and buses to peripheral component endpoints, multiple IOMMUs ensure that each I/O link or bus has appropriate protection and translation applied.

Figure 1:
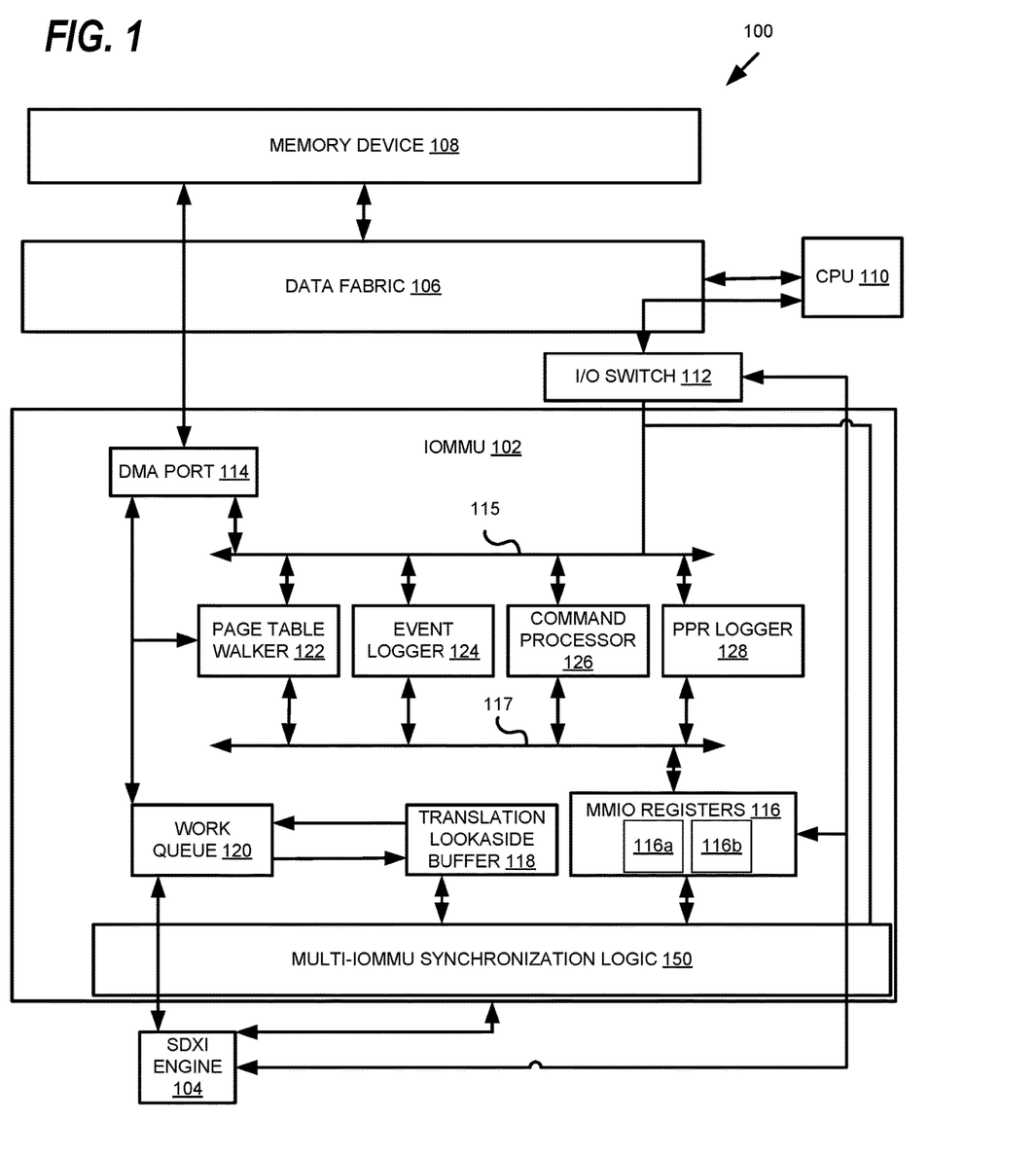
FIG. 1 shows an example of a platform architecture including an IOMMU, according to embodiments of the present disclosure.

FIG. 1 shows an example of a platform architecture including an IOMMU, according to embodiments of the present disclosure. The exemplary architecture 100 is provided for supporting multiple address spaces to facilitate data movement. As shown in FIG. 1, the architecture 100 includes an IOMMU 102, a peripheral component endpoint, such as SDXI engine 104, data fabric 106, memory device 108, and CPU 110. The IOMMU 102 is a multi-context IOMMU. As used herein, context is considered the environment within which kernels execute and a domain in which synchronization and memory management is defined. The context includes a set of IOMMU MMIO registers, page tables in memory, and various ring-buffers, such as command queues. Command queues can be used for IOMMU translation lookaside buffer (TLB) management, i.e., to indicate to the IOMMU that a TLB entry should be invalidated due to a change in underlying memory data structure, such as, for example, a page table. The IOMMU 102 includes logic to perform virtual to physical address translation for device memory accesses. The architecture 100 may also include a I/O switch 112 coupled to the data fabric 106 to facilitate communication between the IOMMU 102 and CPU 110 and/or other IOMMUs. I/O switch 112 can also be incorporated into IOMMU 102.

In some embodiments, the IOMMU 102 also includes, or has access to, DMA port 114, MMIO registers 116, a translation lookaside buffer (TLB) 118, work queue 120, page table walker 122, event logger 124, command processor 126, and PPR logger 128. I/O switch 112, DMA port 114, page table walker 122, event logger 124, command processor 126, and PPR logger 128 are connected to each other through an interconnect 115. Page table walker 122, event logger 124, command processor 126, and PPR logger 128 are connected to each other through an interconnect 117.

DMA port 114 facilitates DMA transactions that have already been translated. The TLB 118, as an example, is implemented in a content addressable memory (CAM) to accelerate translation of logical (i.e., virtual) memory addresses to physical memory addresses for requests for data in system memory 108. Work queue 120 is used for executing operations, along with all associated memory data structures such as control and status information. To avoid deadlocks, the IOMMU uses page table walker 112 for page table walk requests. Upon a TLB miss, page table walker 112 walks an in-memory page table to locate the desired virtual-to-physical address mapping. The translation requests that miss in the TLB hierarchy queue up in the IOMMU's page walk request buffer. When the IOMMU detects an event of any kind, event logger 124 writes an appropriate event entry into the event log located in system memory. Host software controls the IOMMU, and the host software writes commands into the command processor 126. The IOMMU then reads the commands and executes them at its own pace.

Each IOMMU 102 includes MMIO registers 116 that include local MMIO registers 116a and remote context registers 116b. Local MMIO registers 116a are directly programmed by driver software and correspond to the local context. Remote context MMIO registers 116b are shadow copies of a subset of the MMIO registers of all other IOMMU instances. IOMMUs track MMIO register programming of other IOMMUs to access memory structures not belonging to the local IOMMU, which allows SDXI engine requests to appear virtually translated by another IOMMU. IOMMUs can cache data structures associated with other IOMMUs and ensure that data structures that are not shared by SDXI engine traffic to different IOMMU contexts, such as DomainID and BDF assignment, are context specific.

Each IOMMU is provided with local context MMIO registers 116*a* for translating local context DMA. Each IOMMU is also provided with remote context MMIO registers 116*b* for translating DMA from non-local contexts. Each IOMMU maintains a version of the remote context MMIO registers 116*b* which correspond to the local context MMIO registers in each other IOMMU. Each IOMMU maintains a version of these registers corresponding to each other IOMMU. Non-MMIO registers are programmed identically across IOMMU Contexts and therefore are not shadowed per context.

IOMMU messages, as discussed below, are used to automatically update all remote context MMIO registers 116*b* in other IOMMU instances when applicable MMIO registers have been written. For example, in certain embodiments of the present disclosure a total 22×32 bit registers are shadowed, and IOMMU MMIO message types, such as IOMMU device table base address register messages and IOMMU exclusion base register messages, are used when automatically update all MMIO registers 116.

MMIO registers 116 that maintain registers correspond to other IOMMUs are not written prior to enabling multi-context IOMMU support for all IOMMUs within the system. Both IOMMU MMIO message types require MMIO message credits, of which an initial value is register configurable, and may default to a predetermined value such as 32. Slave IOMMUs will use MMIO credit field of IOMMU message to acknowledge register updates. All MMIO registers 116 are programmed independently of other IOMMU instances. Further, it is possible, for instance, for SDXI engines to virtually target an IOMMU instance where an IOMMU register for enabling/disabling is set, even if such register is disabled for the IOMMU instance the SDXI engine is physically connected to.

MMIO registers 116 for each of the IOMMUs include registers for whether an IOMMU is Enabled/Disabled for the particular context, registers for controlling if event logs triggered by a SDXI access to the particular context will be forwarded to a context owning IOMMU, registers for whether table walk access associated with the particular IOMMU context must be coherent, registers for whether PPRs messages can be forwarded to an IOMMU context owner, registers for whether the particular IOMMU context supports Guest Translation, registers for whether the particular IOMMU context supports AVIC, and registers for controlling if GA Logs triggered by SDXI engine AVIC interrupts to the particular context will be forwarded to a context owning IOMMU.

MMIO registers 116 for each of the IOMMUs also include registers for specifying a number of DTE segments supported by the particular IOMMU context and for determining which bits of device StreamID are used to index the DTE table, registers for specifying guest access with user only permission on the particular IOMMU context registers for specifying enhances Page Request Interface (PRI) are enabled for the particular IOMMU context, where the particular IOMMU can abort PRI if SDXI engine DTE is configured, then the IOMMU forwards event logs to the context owning IOMMU as applicable.

MMIO registers 116 for each of the IOMMUs further include registers for specifying whether guest dirty is bit enabled for the particular IOMMU context, whether X2APIC support is enabled for the particular IOMMU context, whether IOMMU virtualization can be used by devices under the particular IOMMU context, whether guest access bit support is enabled for the particular IOMMU context, and whether AVIC GAPPI is enabled for the particular IOMMU context.

MMIO control and status registers of the MMIO registers 116 include IOMMU device table base address registers, which are registers for Device Table base address that specifies bits of a bytes aligned base address of a first level Device Table, and registers for a size of the Device Table, which includes values that specifies the size of the Device Table. If device table segmentation is not supported or not enabled, this register establishes the base address of the single, unified Device Table. When device table segmentation is supported and enabled, the register serves as the base address register for segment 0 of the Device Table.

MMIO control and status registers of the MMIO registers 116 include IOMMU exclusion base registers for specifying a base device virtual address of the IOMMU exclusion range. Device accesses that target addresses in the exclusion range are neither translated nor access checked if a bit in the Device Table is set for the device or if an allow bit is set in this register. The exclusion range test is not applied to device transactions presenting a valid predetermined prefix. In certain embodiments, MMIO control and status registers of the MMIO registers 116 include IOMMU exclusion range limit registers for specifying a limit of the IOMMU exclusion range.

As mentioned above, IOMMU messages are used to automatically update all MMIO registers 116 in other IOMMU instances when applicable MMIO registers 116 have been written. For example, IOMMU device table base address register messages are in a predetermined format, and IOMMU device table base address register messages will include the IOMMU device table base address registers, which the IOMMU sends if any field in the applicable registers is modified. IOMMU exclusion base register messages are in the predetermined format, and IOMMU exclusion base register messages will include the MMIO exclusive base registers and IOMMU exclusion range limit registers, which the IOMMU sends if any field in the applicable registers is modified.

Multi-IOMMU synchronization logic 150 of IOMMU 102 facilitates in the processing of IOMMU messages, synchronization of the MMIO registers 116, and context decoding for the IOMMU. Multi-IOMMU synchronization logic 150 is hardware control logic operative to synchronize the plurality of MMIO registers of multiple IOMMUs, receive direct memory access (DMA) request, access the plurality of MMIO registers of the IOMMU based on the context data of the DMA request, assist in the accessing of virtual and/or physical functions assigned to the memory address space, etc.

Figure 2:
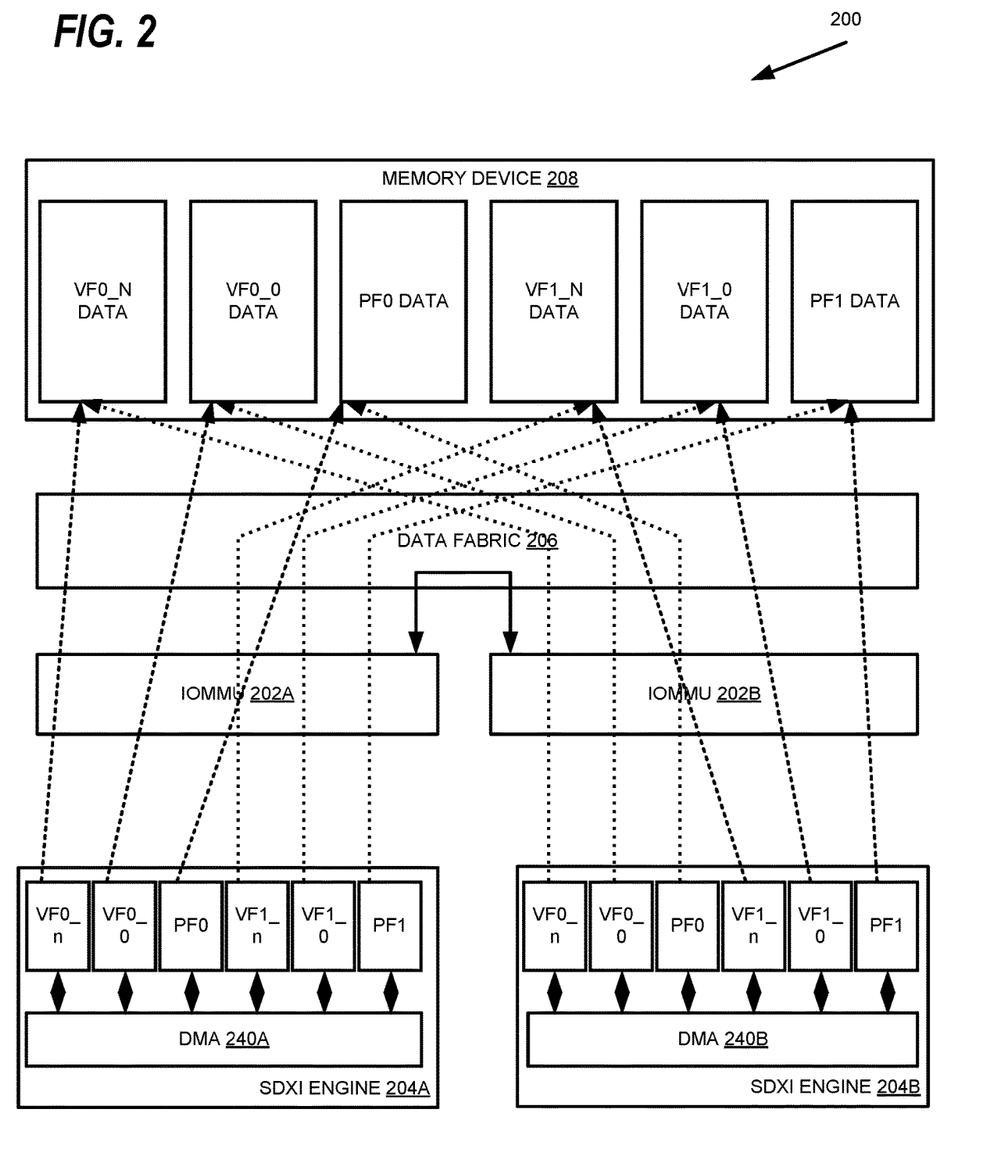
FIG. 2 shows an example of a platform architecture including an IOMMU and SDXI Engines, according to embodiments of the present disclosure.

In embodiments of the present disclosure, an SDXI engine 104, which is a particular peripheral component endpoint, is a software and hardware solution that facilitates low latency and high bandwidth transfer of data between at least two distinct address domains on a host system. FIG. 2 shows an example of a platform architecture including an IOMMU and SDXI engines, according to embodiments of the present disclosure. The SDXI engines 204A and 204B including DMA engines 240A and 240B, respectively, exposed to software through a single root I/O virtualization physical function (SR-IOV PF) and multiple, single root I/O virtual functions (SR-IOV VFs), each of which can be mapped to a different address domain in memory device 208, and the capability to move data between these functions. The SDXI engines 204A and 204B offload a hypervisor (HV) and CPU resources and reduces software stack complexity required to maintain data transfer between at least two guest operating system(s) (OS(s)) or a guest OS and a HV.

To meet bandwidth requirements, SDXI engines 204A and 204B are integrated with separate IOMMUs 202A and 202B, and data fabric paths of data fabric 206 are integrated to system memory 208. For example, in a system, there can be four SDXI engines per socket, with a four socket capability, and therefore, up to sixteen SDXI engines in a system. In order to reduce software overhead, and obscure system level implementations from software, virtual machines (VMs) and HVs avoid maintaining multiple device table entries (DTEs) for a SDXI engine. Each SDXI engine has a physical function (PF), and multiple VFs, however, each VM will only need to attach to one VF and be able to utilize all SDXI engine instances to facilitate data transfer between any other SDXI engine PF/VFs, regardless of how many SDXI engine instances are present on a system. Thus, the system, as described in embodiments of the present disclosure, allows I/O devices under one IOMMU instance to appear virtually connected to another IOMMU instance.

When enabling the use of multi-context IOMMU features, each IOMMU instance is assigned to a unique Context ID. An SDXI engine indicates which function out of the set of all functions, such as PFs and VFs, on all SDXI engines within a function group is generating a DMA request. The IOMMU receiving the DMA request uses these indications to determine which IOMMU context to use to translate the DMA request. A function number may be communicated over a bus, such as, for example, a PCIe bus, using a standard Requester ID (Bus/Device/Function). Additional function identification information may also be communicated over the bus, such as Segment ID, or through proprietary means, such as user bits to a system hub. When the indications are not set, requests are treated as if the context is programmed to the unique Context ID of IOMMU the devices physically connected to the IOMMU.

Each SDXI engine spans multiple VFs encoded with an identifier field. Bus Device Function (BDF) assignments are relative to IOMMU contexts, and therefore, SDXI engine bus number ranges, which are derived on hubs numbers, such as NBIF Secondary/Subordinate Bus numbers, are also context specific. Across IOMMU contexts, BDF assignments can overlap between different devices, these devices do not necessarily share memory pages and have different DTEs.

Some requests require writing to IOMMU controlled memory data structures, such as Event Log, Guest Avic (GA) Log, and Peripheral Page Request (PPR) Log. An IOMMU will forward appropriate logs through a IOMMU message to a virtually targeted IOMMU. SDXI engines can be a target of downstream requests, and these requests include Peripheral Page Request (PPR) Response and I/O Translation Look-aside Buffer (IOTLB) Invalidation messages generated by IOMMU, as described below.

Each IOMMU is configured to process enablement/initialization of the IOMMU multi-context feature, specific request types, and transmit and receive messages from corresponding IOMMUs. For SDXI initialization, the IOMMU defines initialization registers that encodes the Context ID of local IOMMU and plurality of other initialization registers that encode the Context IDs of corresponding IOMMU instances. The other initialization registers encode a status and a location of other IOMMUs that are assigned to a particular contexts. Both initialization registers are programmed before the IOMMU is enabled and an SDXI engine starts sending cross context requests.

The initialization registers of each IOMMU include a register that enables multi-context awareness inside the local IOMMU, a register that includes a value of the context ID of the local IOMMU instance, and a register that includes a total number of IOMMU contexts within a system. Each IOMMU initialization registers also includes IOMMU context identifier control registers for each of the IOMMU contexts within the system. The IOMMU context identifier control registers include a register that identifies whether the other IOMMU is multi-context aware, a peripheral component endpoint segment identifier associate with the other IOMMU that is multi-context aware, and a bus number associated with the other IOMMU that is multi-context aware. The IOMMU context identifier control registers are programmed the same across all IOMMU instances within a host system. Moreover, one of the IOMMU context identifier control registers will correspond to local IOMMU and encode the Bus and Segment ID of the local IOMMU.

Each IOMMU also includes configuration registers that override a default number of credits available for an IOMMU on a per buffer granularity. For example, the system can be configured to allow only one outstanding message of each type if required, or per type, i.e., only one outstanding MMIO register update message. The number of available credits is programmed during boot, and can be programmed before or after multi context support is enabled, as mentioned above.

The number of credits available can depend on a number of SDXI engines within a system. For example, if there are less than 16 contexts supported, the number of credits available can scale, such as in a one socket system, the amount of credits per IOMMU context can increase to 160 instead of 32. The configuration registers for each IOMMU include a total number of outstanding PPR log messages supported, a total number of outstanding event log messages supported, a total number of outstanding command processors supported, a total number of outstanding GA log messages supported, and a total number of outstanding MMIO register update messages supported.

To support servicing SDXI engines physically under a different IOMMUs but accessing shared data structures of the IOMMU, such as PPR Log, GA Log, EL Log, Command Processor, and to synchronise MMIO register programing across IOMMU instances, IOMMU messages are used to transfer data between IOMMUs via Multi-IOMMU synchronization logic 150. IOMMU messages are sent with Route By ID decoding and are expected to only target other IOMMUs.

IOMMU messages can be transferred from the IOMMU through an I/O switch 112 to the data fabric, and from the data fabric to other IOMMUs, via corresponding I/O switches of other IOMMUs, based on IOMMU's bus device function. IOMMU messages generated by IOMMU can have a predetermined format and sent as is to the data fabric. Messages received by other IOMMUs from the data fabric can be converted to other predetermined formats prior to being forwarded to IOMMU, as necessary, Multi-IOMMU synchronization logic 150.

Each IOMMU implements a predetermined amount of buffers per IOMMU instance for accepting data from other IOMMUs that cannot be processed in a same cycle. These data types are for PPR logs, Event Logs, and GA Logs and a command processor command buffer. Each entry can be a predetermined number of bits, and each buffer can store up to a predetermined amount of entries. The credit scheme, mentioned above, is used to track used and available credits. Credit is released via the IOMMU message, with individual field per credit type. The IOMMU has a predetermined number of credits for each other IOMMUs buffer after reset. A register override can be provided for debug purposes, and to allow larger data being transferred while less the maximum number of SDXI engines supported.

An IOMMU uses message codes and fields from data to confirm that received IOMMU messages are in the predetermined IOMMU message format. Messages that are not in the predetermined IOMMU message format may not be supported and can be aborted. For example IOMMU messages maybe be a minimum data size of 512 bits, where the first 256 bits of data include encapsulated peripheral component message fields, and the second 256 bits include IOMMU specific fields. Data payload after first 512 bits can be 128 bit aligned and are treated as IOMMU message type data.

IOMMU messages includes fields for an IOMMU instance ID, a message type, such as a credit release, an event log type, a PPR type, a command processor type, a GA log type, a MMIO control and status register update, an IOMMU exclusion base register update, and a SDXI error. IOMMU messages also include fields for a bus number of the SDXI physical function. For example, the IOMMU will store the SDXI bus number and use it to route Auto PPR response and PPR response directly to an SDXI engine. IOMMU messages also include fields credits for IOMMU MMIO message types, such as IOMMU device table base address register messages and IOMMU exclusion base register messages, as explained below, fields for PPR credits released back to slave IOMMUs, fields for event log credits release back to slave IOMMUs, fields for command processor credits released back to a master IOMMU, fields for GA Log credits released back to slave IOMMUs, fields for physical device and function number of the SDXI engine, where the master IOMMU stores SDXI engine device and function identifiers and use it to route Auto PPR response and PPR response directly to an SDXI engine physical device and function, and fields for a SDXI message payload for corresponding message type.

Figure 3:
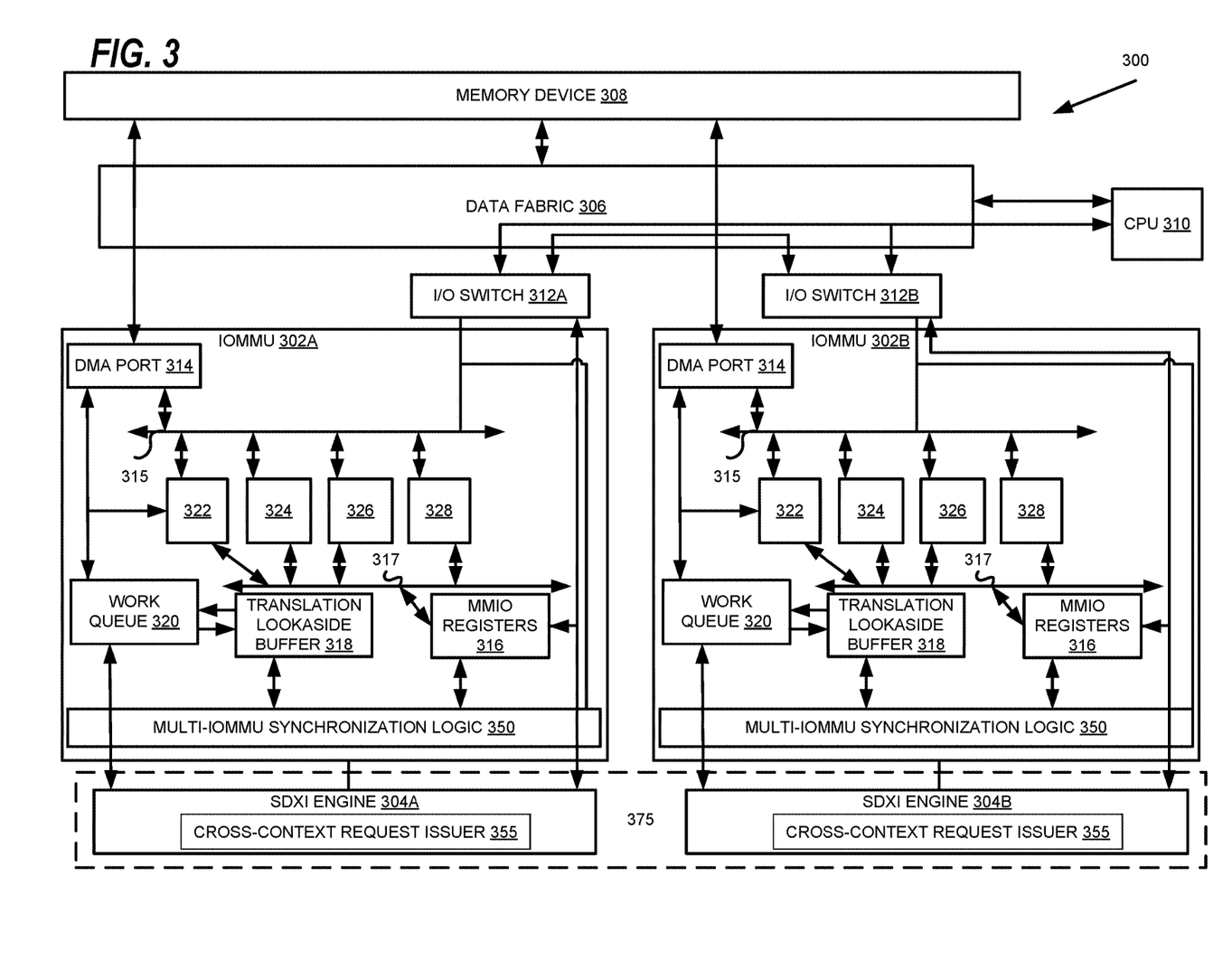
FIG. 3 shows an example of a platform architecture including a plurality of IOMMUs, according to embodiments of the present disclosure.

FIG. 3 shows an example of a platform architecture including a plurality of IOMMUs, according to embodiments of the present disclosure. The exemplary architecture 300 is provided for supporting multiple address spaces to facilitate data movement. As shown in FIG. 3, the architecture 300 includes IOMMUs 302A and 302B, peripheral component endpoints, such as SDXI engines 304A and 304B, data fabric 306, memory device 308, and CPU 310. The IOMMUs 302A and 302B are multi-context IOMMUs. Each of IOMMUs 302A and 302B includes logic to perform virtual to physical address translation for memory page access for devices. The architecture 300 may also include I/O switches 312A and 312B coupled to the data fabric 306 to facilitate communication between the IOMMUs 302A and 302B and CPU 310. I/O switches 312A and 213B can also be incorporated into IOMMUs 302A and 302B, respectively.

In some embodiments, each of the IOMMUs 302A and 302B includes, or has access to, DMA port 314, MMIO registers 316 including local MMIO registers, such as local MMIO registers 116a, and remote context MMIO registers, such as remote context MMIO registers 116b, a translation lookaside buffer (TLB) 318, work queue 320, page table walker 322, event logger 324, command processor 326, and PPR logger 328. I/O switch 312A/312B, DMA port 314, page table walker 322, event logger 324, command processor 326, and PPR logger 328 are connected to each other through an interconnect 315. Page table walker 322, event logger 324, command processor 326, and PPR logger 328 are connected to each other through an interconnect 317.

One or more of IOMMUs 302A and 302B may receive a DMA request from respective SDXI engines 304A and 304B that requires translation by an IOMMU belonging to a non-local IOMMU context. These requests are of DMA untranslated, DMA translation, or DMA pre-translated type, operating in sATS and non sATS mode.

SDXI engines 304A and 304B can send fixed and arbitrated remappable interrupts, as well as other interrupts. The SDXI engines 304A and 304B can be a grouping of SDXI engines can include a collection of interconnected instances referred to as a function group 375, as shown in FIG. 3. IOMMU will use DTE and IRTE structures from requested IOMMU context to service interrupts. If AVIC is enabled, IOMMU may require generation of GA Log, these will be forwarded to IOMMU context owner for serialized storage in GA log buffer, via new IOMMU VDM support.

IOMMUs 302A and 302B maintain the Event Log associated with its own IOMMU context and accept Event Logs from other IOMMUs if they are applicable to its context. Similarly, IOMMUs 302A and 302B forward event logs to IOMMU Context owner as applicable if context supports Event Logging. IOMMU messages are used to transfer Event Logs across IOMMUs 302A and 302B. A IOMMU master will directly write to Event log buffer with a message payload when receiving messages with an event log message type. A IOMMU slave will format payload with correct event log fields, as would be pushed to a software visible event log buffer.

SDXI engines 304A and 304B can issue PPRs to IOMMUs 302A and 302B, respectively, that are applicable to a context virtually targeting a different IOMMU instance. If enhance PRI is supported, IOMMUs 302A and 302B fetch DTE, and perform applicable checks prior to forwarding PPR request to IOMMU context master through messages. If enhanced PRI feature is not supported, DTE will not be fetched, but request will still be forwarded. When IOMMUs 302A and 302B receive PPR logs through message, which corresponds to a PPR request virtually targeting this IOMMU's context, but physically located under a different IOMMU. IOMMUs 302A and 302B will log these into its associated PPR buffer for servicing by software.

If enhanced PRI support is enabled, PPRs will require additional handling when received by a IOMMU master including re-fetching DTE. As a performance enhancement, IOMMUs 302A and 302B can implement a DTE IGNORE bit, appended to PPR command, set by a IOMMU slave, used by a IOMMU master to avoid fetching DTE when not required.

PPR auto response messages, and normal PPR response messages fetched from Command Buffer will be forwarded directly to correct SDXI engine 304A/304B requestor. To facilitate this, IOMMUs 302A and 302B will encode IOMMU context of issuing SDXI engine 304A/304B into most significant bits of PPR Page Request Group Index field. This will restrict the number of PPR index groups available to SDXI engine 304A/304B dependent on a number IOMMU contexts supported on the system. PPR auto response messages targeting a SDXI engine 304A/304B not under the IOMMU will be sent through the data fabric in a predetermined message format. Target Bus ID and physical device function of SDXI engine 304A/304B is stored from the message of original PPR request, all PPR responses will be forwarded to this destination. SDXI engine 304A/304B uses the Group Index field to map PRG response to PPR request.

As mentioned above, each IOMMUs 302A and 302B includes a command processor 326, which is used to invalidate IOMMU data structures associated with its context. each IOMMUs 302A and 302B will forward commands to other IOMMUs as described in a command action table using IOMMU message format. Commands may originate from either HV or IOMMU command Queues.

IOMMUs 302A and 302B receiving commands through IOMMU message service commands serially with respect to commands from the same context. To prevent dead lock, IOMMUs 302A and 302B are able process commands from different contexts in parallel. IOMMUs 302A and 302B can stall processing commands on its own context if out of command processor credits for some IOMMU instance, however, must be able to process commands from other IOMMU contexts.

When a Completion Wait Command received through IOMMU Command Processor is forwarded to all other IOMMUs using IOMMU messages, IOMMUs 302A and 302B can stall issuing more commands until all command processor credits are returned. IOMMUs 302A and 302B can also wait for all credits as a synchronization mechanism prior to performing Completion Wait write back or Interrupt.

A master command processor 326 of IOMMUs 302A and 302B can be used to flush out AT caches of SDXI engines 304A and 304B respectively, if ATS is enabled. To invalidate SDXI IOTLB caches, an IOTLB invalidation command is pushed into IOMMU command processor 326 followed by Completion Wait command. An IOMMU will filter and drop any IOTLB invalidation from the command processor 326 targeting SDXI SR-IOV range, the IOMMU will then generate a single internal IOTLB invalidating the entire address space of a SDXI engine physical device function. An IOMMU does not issue an internal IOTLB invalidation to an SDXI engine unless the IOMMU receives a SDXI targeted IOTLB invalidation since last executed Completion Wait command. Upon receiving any IOTLB invalidation command, the SDXI engine acknowledges the IOTLB after clearing all internally stored translation data, across all IOMMU contexts and Virtual/Physical functions. The IOMMU will set fields for Completion Wait commands forward to slave IOMMU contexts through IOMMU messages. If IOMMU slave contexts receives a Completion Wait with the fields set, the IOMMU shall issue internal IOTLB to SDXI engine.

Figure 4:
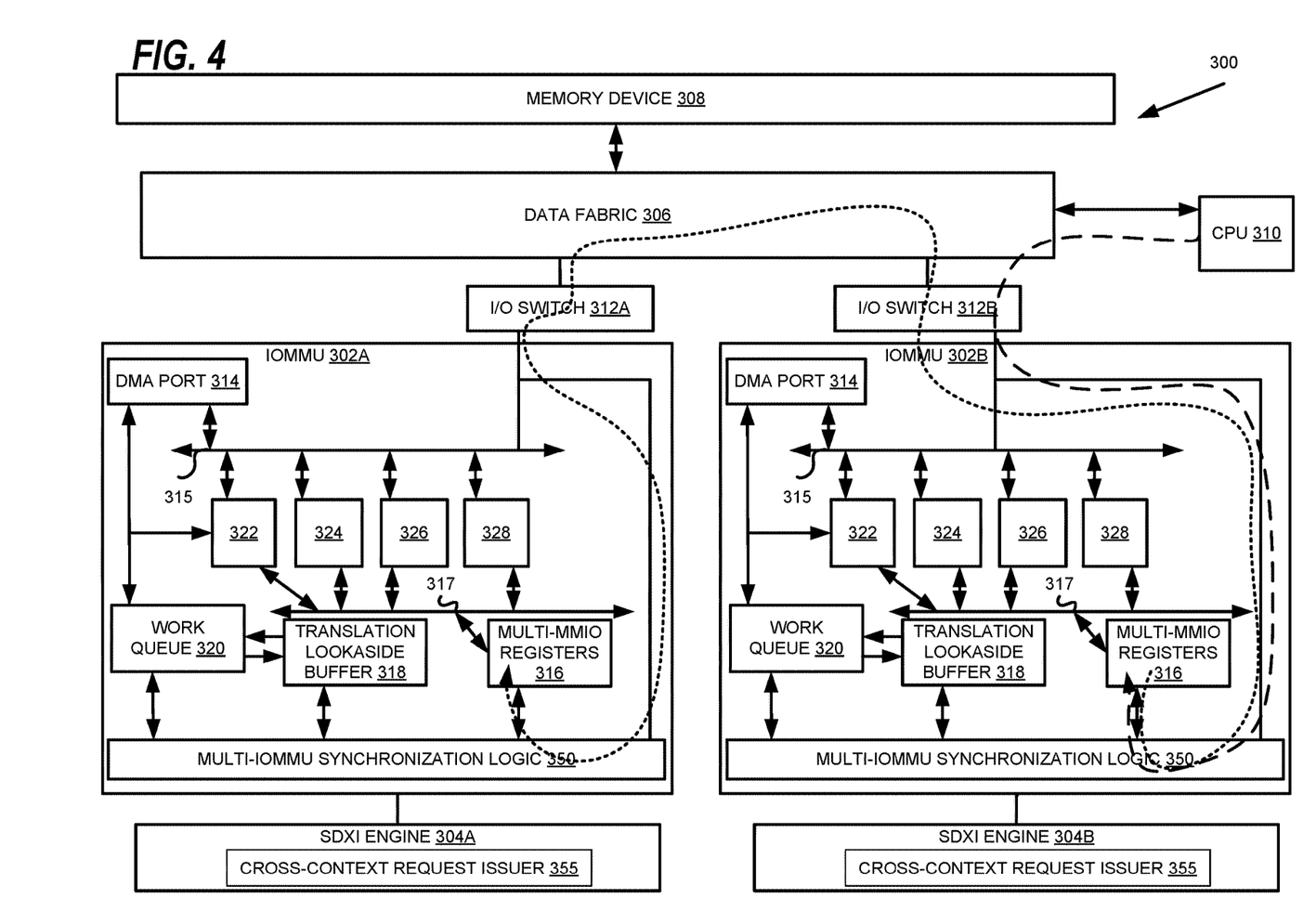
FIG. 4 illustrates in block diagram form for MMIO register update flows of FIG. 3 according to some embodiments.

FIG. 4 illustrates in block diagram form for MMIO register update flows of FIG. 3 according to some embodiments. As shown in FIG. 4, software directly programs the local context within IOMMU 302B using a configuration and initialization path, as shown by the long dashed line.

TABLE 1

Command Action Table

| IOMMU COMMAND | IOMMU CONTEXT Master ACTION | IOMMU CONTEXT Slave ACTION |
|---|---|---|
| COMPLETION_WAIT | 1. Forward to all IOMMUs. 2. If applicable, send SDXI IOTLB_INV, wait for Completion messages, 3. Flush all applicable Pipelines. 4. Wait for credits all command processor from all other IOMMUs | 1. If applicable, send SDXI IOTLB_INV, wait for Completion messages, 2. Flush all applicable Pipelines. 3. Issue ACK IOMMU message. |
| INVALIDATE_DEVTAB | Invalidate DTE and forward command to all IOMMUs if targeting SDXIPF/VF BDF Range | Invalidate DTE cache. |
| INVALIDATE_IOMMU_PAGES | Invalidate PDE/PTE entries, forward command to all IOMMUs. | Invalidate PDE/PTE entries. |
| INVALIDATE_IOTLB_PAGES | Ignore if targeting SDXI PF/VF BDF Range | N/A |
| INVALIDATE_INTERRUPT_TABLE | Invalidate ITE, forward command to all IOMMUs if targeting SDXI PF/VF BDF Range | Invalidate ITE. |
| COMPLETE_PPR_REQUEST | If targeting SDXI PF/VF BDF Range, create PPR Response MSG to correct SDXI based on IOMMU Context ID encoded in PPR Index Group field. | N/A |
| INVALIDATE_ALL | Invalidate all caches, forward to all IOMMUs. | Invalidate all caches. |
| INSERT_GUEST_EVENT | No special consideration for SDXI. | N/A |
| RESET_IOMMU | No special consideration for SDXI. | N/A |

IOMMU 302B, using IOMMU messages, multi-cast local registers to all other IOMMUs, such as IOMMU 302A.

Figure 5:
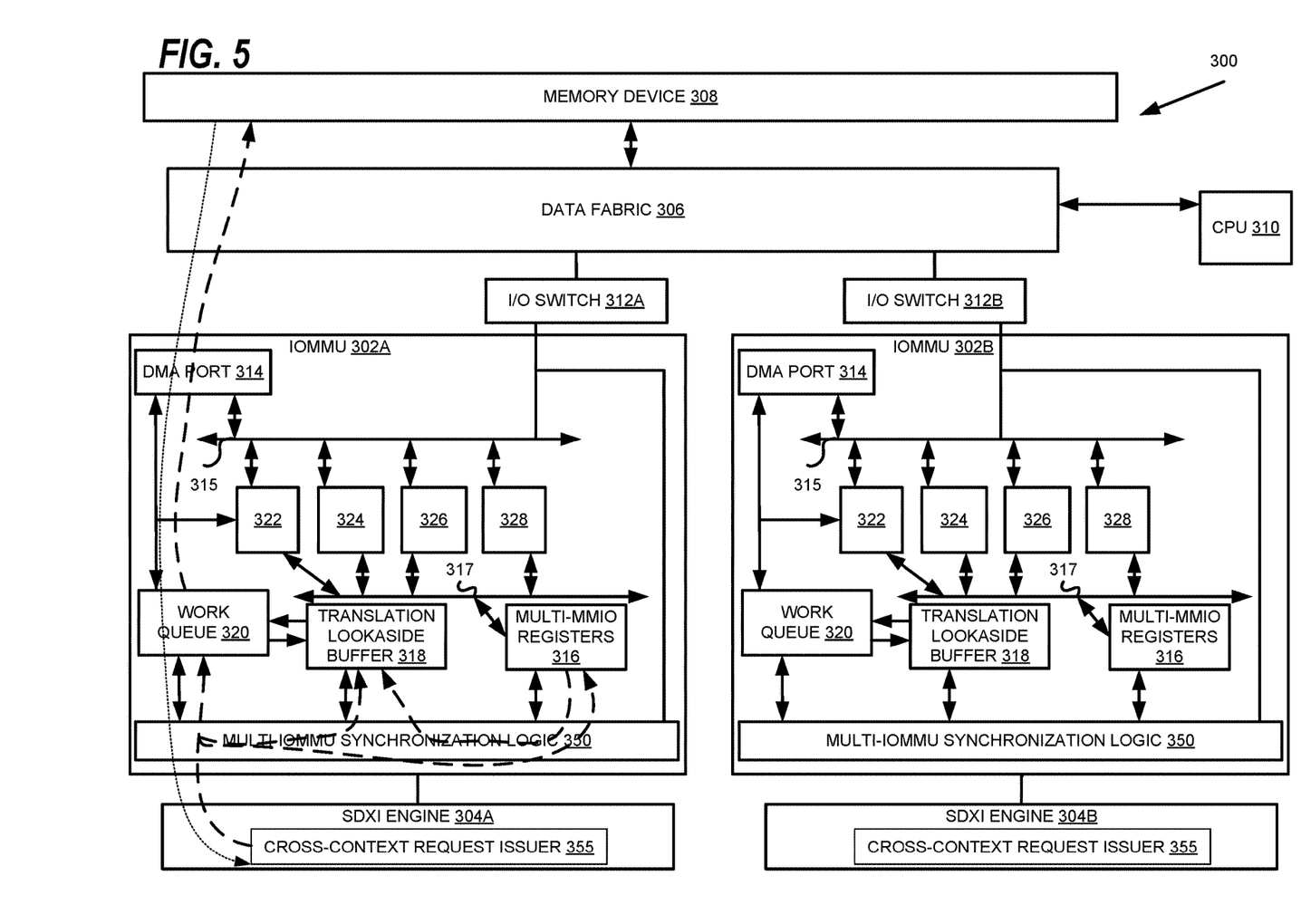
FIG. 5 illustrates in block diagram form for DMA requests flows of FIG. 3 according to some embodiments.

FIG. 5 illustrates in block diagram form for DMA requests flows of FIG. 3 according to some embodiments. As shown in FIG. 5, each DMA requests from cross-context request issuer 355 of SDXI engine 304A carries an IOMMU context identifier which is used by the multi-IOMMU synchronization logic 350 of IOMMU 302A to identify which IOMMU context to use for translating the DMA request. Each IOMMU context is allowed to be programmed independently, and point to different data structures or reuse encodings for things such as Domain ID. TLBs are additionally tagged with Context Identifier to lookup the translation for matching context. Context registers of MMIO registers 316 are used based on the incoming context identifier. The context registers point to data structures such Device Table, etc., that can be programmed independently by software for each context DMA accesses that are translated using remote IOMMU context still occurs over Physical DMA port of the local IOMMU context.

Figure 6:
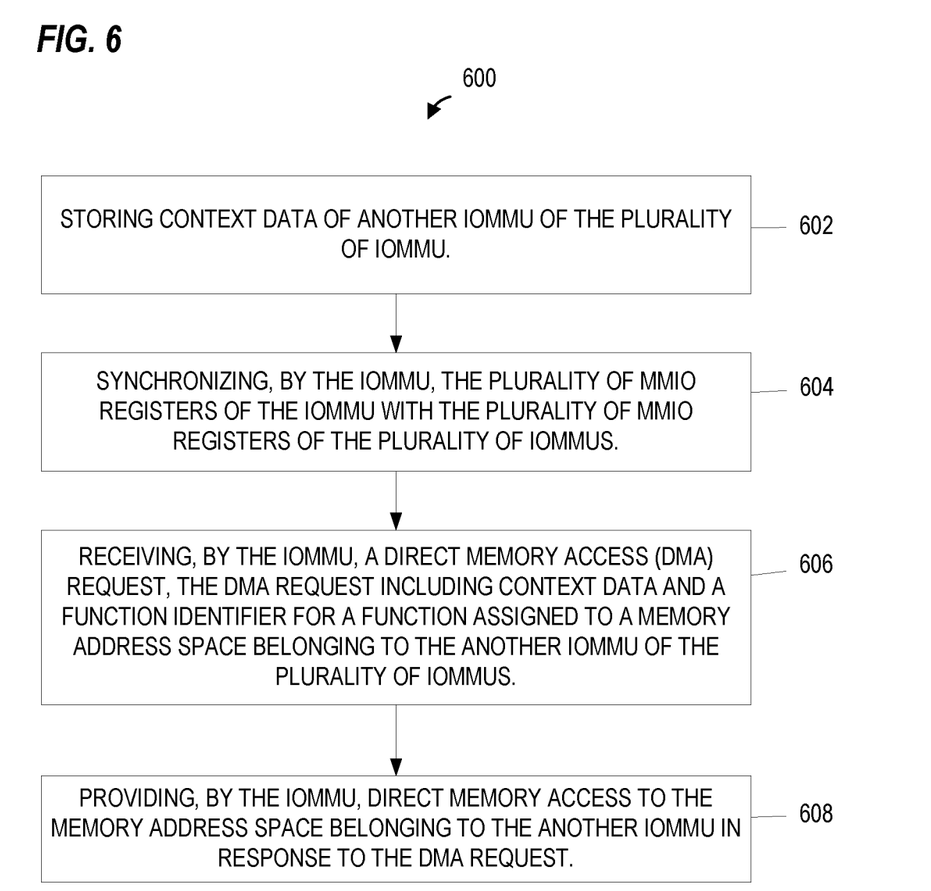
FIG. 6 is a flowchart illustrating a method for providing data movement among multiple address spaces, according to embodiments of the present disclosure.

FIG. 6 is a flowchart illustrating a method for providing data movement among multiple address spaces, according to embodiments of the present disclosure. The operations may be performed in any suitable order. As shown in FIG. 6, method 600 includes step 602 for storing, such as by the multi-IOMMU synchronization logic 350 of the IOMMUs 302A and 302B, context data of another IOMMU of the plurality of IOMMU. Each of the plurality of IOMMUs, such as IOMMUs 302A and 302B, is associated with a different memory access requestor, such as cross-context request issuer 355 of SDXI engines 304A and 304B, that is associated with a different address space of the multiple address spaces. Each of the IOMMUs includes a plurality of memory-mapped input/output (MMIO) registers, such as MMIO registers 316, that map the memory access requestors that are associated with the address spaces of the multiple address spaces.

As shown in FIG. 6, the method 600 includes step 604 for synchronizing, by the IOMMU, the plurality of MMIO registers of the IOMMU with the plurality of MMIO registers of the plurality of IOMMUs. The synchronizing of the plurality of MMIO registers of the IOMMU with the plurality of MMIO registers of the plurality of IOMMUs includes initializing, by the IOMMU, the plurality of MMIO registers of the IOMMU with the context data of the plurality of MMIO registers of the plurality of IOMMUs; and tracking, by the IOMMU, changes to the plurality of MMIO registers of the plurality of IOMMUs. The initializing of the plurality of MMIO registers of the IOMMU with the context data of the plurality of MMIO registers of the plurality of IOMMUs includes receiving, by the IOMMU for each IOMMU of the plurality of IOMMUs, a context ID of the IOMMU and location of the IOMMU. Additionally, the tracking of changes to the plurality of MMIO registers of the plurality of IOMMUs includes transmitting, by the IOMMU to the plurality of IOMMUs, a message when an MMIO register of the IOMMU changes; and receiving, by the IOMMU from another IOMMU of the plurality of IOMMUs, a message when an MMIO register of the another IOMMU of the plurality of IOMMUs changes As shown in block 606, the method 600 includes receiving, by the IOMMU, such as IOMMUs 302A and/or 302B, a direct memory access (DMA) request, the DMA request including context data and a function identifier, such as a PCI segment/bus/device/function, of a function assigned to a memory address space belonging to the another IOMMU of the plurality of IOMMUs. For example, the DMA request is issued with a function identifier that is used to identify the appropriate IOMMU context needed for the IOMMU to perform address translation on the requested address. That is, each IOMMU context is associated with a unique subset of the function identifier space. A function identifier may be associated with multiple address spaces, and the DMA request may optionally include a Process Address Space Identifier (PASID) where a combination of function identifier and PASID combine to reference a page table or a nested set of page tables, such as, for example, Guest and Host page tables, used for address translation.

The DMA request is received from a peripheral component endpoint, such as cross-context request issuer 355 of SDXI engines 304A and 304B, coupled to another IOMMU of the plurality of IOMMUs. The function is a peripheral component endpoint function, which is at least one of a physical function and a virtual function of a plurality of virtual functions of a peripheral component endpoint coupled to another IOMMU of the plurality of IOMMUs. (See, FIG. 2).

As shown in block 608, the method 600 includes providing, by the IOMMU, such as by the DMA port 314, work queue 310, TLB 318, MMIO registers 316, and the multi-IOMMU synchronization logic 350 of the IOMMUs 302A and 302B, direct memory access to the memory address space belonging to the another IOMMU in response to the DMA request.

Figure 7:
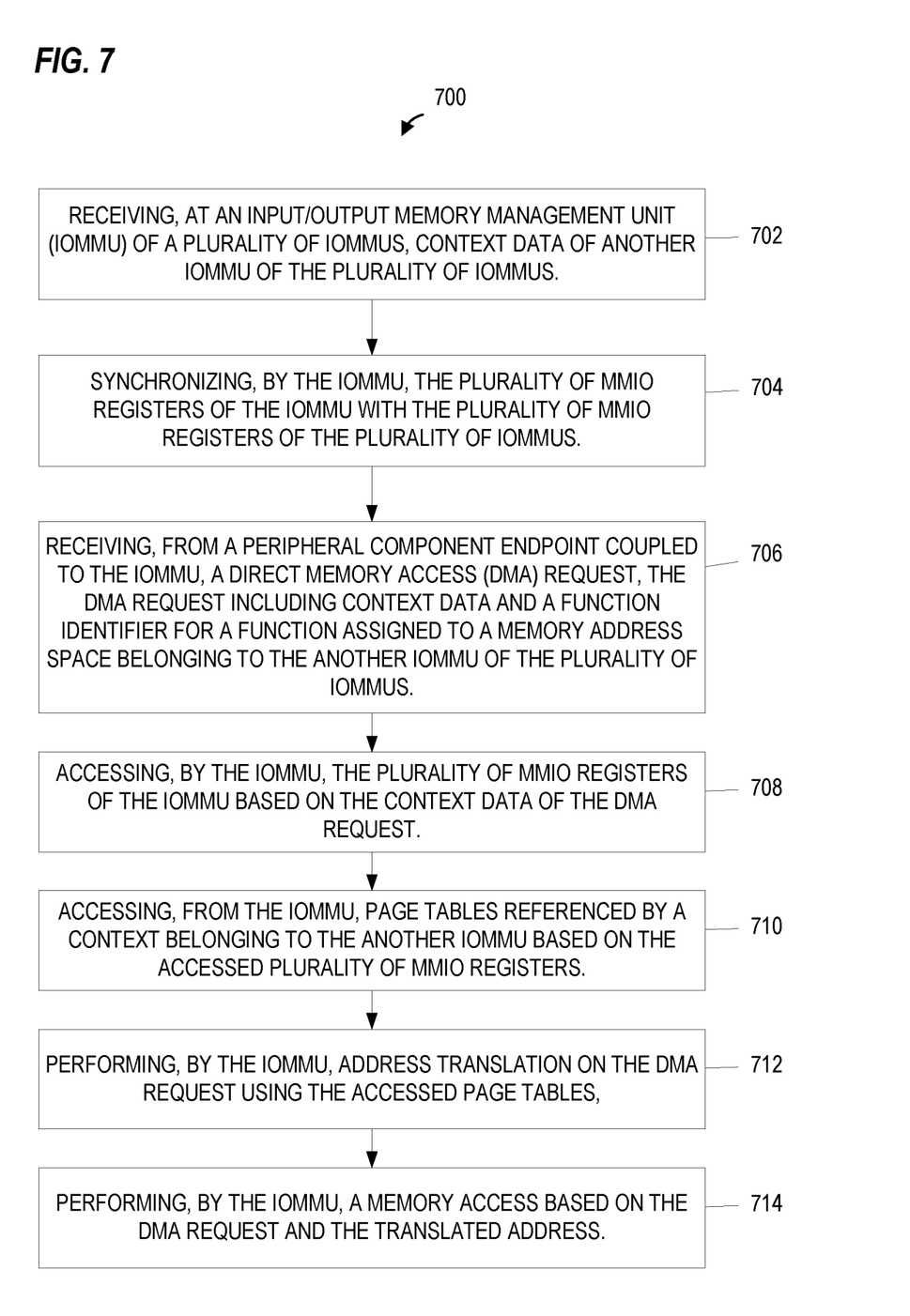
FIG. 7 is a flowchart illustrating a method for supporting multiple memory address spaces to facilitate data movement among a hypervisor and at least one virtual machine, according to embodiments of the present disclosure.

FIG. 7 is a flowchart illustrating a method for supporting multiple memory address spaces to facilitate data movement among a hypervisor and at least one virtual machine, according to embodiments of the present disclosure. The operations may be performed in any suitable order. As shown in FIG. 7, the method 700 includes step 702 for receiving, at an input/output memory management unit (IOMMU) of a plurality of IOMMUs, such as by the multi-IOMMU synchronization logic 350 of the IOMMUs 302A and 302B, context data of another IOMMU of the plurality of IOMMUs. Each of the plurality of IOMMUs includes a plurality of memory-mapped input/output (MMIO) registers, such as MMIO registers 316, that provide address translation, in combination with memory data structures, such as a page table, for memory address spaces belonging to respective IOMMUs of the plurality of IOMMUs.

As shown in FIG. 7, the method 700 includes step 704 for synchronizing, by the IOMMU, the plurality of MMIO registers of the IOMMU with the plurality of MMIO registers of the plurality of IOMMUs. The synchronizing of the plurality of MMIO registers of the IOMMU with the plurality of MMIO registers of the plurality of IOMMUs includes initializing, by the IOMMU, the plurality of MMIO registers of the IOMMU with the context data of the plurality of MMIO registers of the plurality of IOMMUs; and tracking, by the IOMMU, changes to the plurality of MMIO registers of the plurality of IOMMUs. The initializing of the plurality of MMIO registers of the IOMMU with the context data of the plurality of MMIO registers of the plurality of IOMMUs includes receiving, by the IOMMU for each IOMMU of the plurality of IOMMUs, a context ID of the IOMMU and location of the IOMMU. Additionally, the tracking of changes to the plurality of MMIO registers of the plurality of IOMMUs includes transmitting, by the IOMMU to the plurality of IOMMUs, a message when an MMIO register of the IOMMU changes; and receiving, by the IOMMU from another IOMMU of the plurality of IOMMUs, a message when an MMIO register of the another IOMMU of the plurality of IOMMUs changes.

As shown in block 706, the method 700 includes receiving, from a peripheral component endpoint coupled to the IOMMU, such as IOMMUs 302A and/or 302B, a direct memory access (DMA) request, the DMA request including context data and a function identifier, such as a PCI segment/bus/device/function, of a function assigned to a memory address space belonging to another IOMMU of the plurality of IOMMUs. For example, the DMA request is issued with a function identifier that is used to identify the appropriate IOMMU context needed for the IOMMU to perform address translation on the requested address. That is, each IOMMU context is associated with a unique subset of the function identifier space. A function identifier may be associated with multiple address spaces, and the DMA request may optionally include a Process Address Space Identifier (PASID) where a combination of function identifier and PASID combine to reference a page table or a nested set of page tables, such as, for example, Guest and Host page tables, used for address translation.

The DMA request is received from a peripheral component endpoint, such as cross-context request issuer 355 of SDXI engines 304A and 304B, coupled to another IOMMU of the plurality of IOMMUs. The function is a peripheral component endpoint function, which is at least one of a physical function and a virtual function of a plurality of virtual functions of a peripheral component endpoint coupled to another IOMMU of the plurality of IOMMUs. (See, FIG. 2). As shown in block 708, the method 700 includes accessing, by the IOMMU, the plurality of MMIO registers of the IOMMU based on the context data of the DMA request. The accessing of the plurality of MMIO registers of the IOMMU based on the context data of the DMA request includes: decoding the context data of the DMA request; accessing a particular plurality of MMIO registers of the plurality of MMIO registers based on the decoded context data; loading a translation lookaside buffer based on the decoded context data; and translating the DMA request based on the decoded context data. Then, as shown in block 710, the method 700 includes accessing, from the IOMMU, page tables referenced by a context belonging to the another IOMMU based on the accessed plurality of MMIO registers. In particular, accessing the function assigned to the memory address space belonging to the another IOMMU is based the accessed particular plurality of MMIO registers and the translated DMA request. Then, as shown in block 712, the method 700 includes performing, by the IOMMU, address translation on the DMA request using the accessed page tables. Finally, as shown in block 714, the method 700 includes performing, by the IOMMU, a memory access based on the DMA request and the translated address.

As described above, the disclosure relates to a context aware IOMMU that provides protection and address translation for I/O devices, such a peripheral component devices, SDXI engines, and PCI endpoints, in multiple root trees in software transparent manner. The solution allows for sophistical these I/O device connected under different root complexes to perform remote DMA using the context aware IOMMU.

A context aware IOMMU can be detectable by analysis of a chip, such as an System on Chip's, I/O power and performance. Moreover, a review of the chip's interconnects would show whether there is a direct physical connection between peripheral component endpoints. For example, if translation services are part of a particular component, there is no large amount of direct physical connections between peripheral component endpoints, and the software is programmed to have IOMMUs reported in the system, then a context aware IOMMU is likely present.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for providing data movement among multiple address spaces, the method comprising:
    storing, by a first input/output memory management unit (IOMMU), context data of a second IOMMU, wherein each of the first and second IOMMUs is associated with a different memory access requestor that is associated with a different address space of the multiple address spaces;
    receiving, by the first IOMMU, a direct memory access (DMA) request to a memory address space belonging to the second IOMMU; and
    providing, by the first IOMMU, direct memory access to the memory address space belonging to the second IOMMU in response to the DMA request.

2. The method according to claim 1, wherein each of the first and second IOMMUs includes a plurality of memory-mapped input/output (MMIO) registers that provide address translation for the memory access requestors that are associated with the address spaces of the multiple address spaces.

3. The method according to claim 2, further comprising:
synchronizing, by the first IOMMU, the plurality of MMIO registers of the first IOMMU with the plurality of MMIO registers of the second IOMMU.

4. The method according to claim 3, wherein synchronizing the plurality of MMIO registers of the first IOMMU with the plurality of MMIO registers of the second IOMMU includes:
initializing, by the first IOMMU, the plurality of MMIO registers of the first IOMMU with context data of the plurality of MMIO registers of the second IOMMU; and
tracking, by the first IOMMU, changes to the plurality of MMIO registers of the second IOMMU.

5. The method according to claim 4, wherein initializing the plurality of MMIO registers of the first IOMMU with the context data of the plurality of MMIO registers of the second IOMMU includes:
receiving, by the first IOMMU from the second IOMMU, a context ID of the second IOMMU and address of the second IOMMU.

6. The method according to claim 4, wherein tracking changes to the plurality of MMIO registers of the second IOMMU includes:
transmitting, by the first IOMMU, to the second IOMMU a message when an MMIO register of the first IOMMU changes; and
receiving, by the first IOMMU from the second IOMMU, a message when an MMIO register of the second IOMMU changes.

7. The method according to claim 1, wherein the DMA request is received from a peripheral component endpoint coupled to second IOMMU.

8. The method according to claim 1, wherein the DMA request includes context data and a function identifier of a function assigned to the memory address space belonging to the second IOMMU.

9. The method according to claim 8, wherein the function is a peripheral component endpoint function, the peripheral component endpoint function is at least one of a physical function and a virtual function of a plurality of virtual functions of a peripheral component endpoint coupled to second IOMMU.

10. A method for supporting multiple memory address spaces to facilitate data movement, the method comprising:
receiving, at a first input/output memory management unit (IOMMU), context data of a second IOMMU, wherein each of the first and second IOMMUs includes a plurality of memory-mapped input/output (MMIO) registers that map memory address spaces belonging to respective IOMMUs;
synchronizing, by the first IOMMU, the plurality of MMIO registers of the first IOMMU with the plurality of MMIO registers of at least the second IOMMU;
receiving, from a peripheral component endpoint coupled to the first IOMMU, a direct memory access (DMA) request, the DMA request to a memory address space belonging to the second IOMMU;
accessing, by the first IOMMU, the plurality of MMIO registers of the first IOMMU based on context data of the DMA request;
accessing, from the first IOMMU, page tables referenced by a context belonging to the second IOMMU based on the accessed plurality of MMIO registers;
performing, by the first IOMMU, address translation on the DMA request using the accessed page tables; and
performing, by the first IOMMU, a memory access based on the DMA request and the translated address.

11. The method according to claim 10, wherein synchronizing the plurality of MMIO registers of the first IOMMU with the plurality of MMIO registers of the second IOMMU includes:
initializing, by the first IOMMU, the plurality of MMIO registers of the first IOMMU with the context data of the plurality of MMIO registers of at least the second IOMMU; and
tracking, by the first IOMMU, changes to the plurality of MMIO registers of at least the second IOMMU.

12. The method according to claim 11, wherein initializing the plurality of MMIO registers of the first IOMMU with the context data of the plurality of MMIO registers of at least the second IOMMU includes:
receiving, by the first IOMMU from at least the second IOMMU, a context ID of the second IOMMU and address of the second IOMMU.

13. The method according to claim 11, wherein tracking changes to the plurality of MMIO registers of at least the second IOMMU includes:
transmitting, by the first IOMMU, to at least the second IOMMU a message when an MMIO register of the first IOMMU changes; and
receiving, by the first IOMMU from at least the second IOMMU, a message when an MMIO register of the second IOMMU changes.

14. The method according to claim 10, wherein the DMA request includes context data and a function identifier of a function assigned to the memory address space belonging to the second IOMMU, and wherein the function is a peripheral component endpoint function, the peripheral component endpoint function is at least one of a physical function and a virtual function of a plurality of virtual functions of a peripheral component endpoint coupled to second IOMMU.

15. The method according to claim 10, wherein accessing the plurality of MMIO registers of the first IOMMU based on the context data of the DMA request includes:
decoding the context data of the DMA request;
accessing a particular plurality of MMIO registers of the plurality of MMIO registers based on the decoded context data; and
loading a translation lookaside buffer based on the decoded context data.

16. An input/output memory management unit (IOMMU) comprising:
a plurality of memory-mapped input/output (MMIO) registers that map memory address spaces belonging to the IOMMU and at least a second IOMMU; and
hardware control logic operative to:
synchronize the plurality of MMIO registers of the at least the second IOMMU;
receive, from a peripheral component endpoint coupled to the IOMMU, a direct memory access (DMA) request, the DMA request to a memory address space belonging to the at least the second IOMMU;
access the plurality of MMIO registers of the IOMMU based on context data of the DMA request; and access, from the IOMMU, a function assigned to the memory address space belonging to the at least the second IOMMU based on the accessed plurality of MMIO registers.

17. The IOMMU according to claim 16, further comprising:
a DMA port coupled a data fabric, the data fabric coupled to a memory, wherein the DMA port configured to access the function assigned to the memory address space belonging to the at least the second IOMMU based on the accessed plurality of MMIO registers.

18. The IOMMU according to claim 16, further comprising:
a context decoder configure to decode the context data of the DMA request; and
a translation lookaside buffer configured to translate the DMA request, wherein accessing the function assigned to the memory address space belonging the at least second IOMMU is based on the accessed plurality of MMIO registers and the translated DMA request.

19. A data processing system, comprising:
a host processor;
a memory;
a data fabric coupled to the host processor and to the memory;
a first input/output memory manage unit (IOMMU) and a second IOMMU, each of the first and second IOMMUs coupled to the data fabric; and
a first peripheral component endpoint and a second peripheral component endpoint, each of the first and second peripheral component endpoints coupled to a corresponding IOMMU of the first and second IOMMUs,
wherein each of the first and second IOMMUs comprises hardware control logic operative to:
synchronize the first and second IOMMUs;
receive, from the peripheral component endpoint coupled to the first IOMMU, a direct memory access (DMA) request, the DMA request to a memory address space belonging to the second IOMMU; and
the first IOMMU configured to provide direct memory access to the memory address space belonging to the second IOMMU in response to the DMA request.

20. The system according to claim 19, wherein each of the first IOMMU and the second IOMMU further comprises a plurality of memory-mapped input/output (MMIO) registers, wherein each of the hardware control logic further operative to: communicate with each of the plurality of MMIO registers of the first and second IOMMUs via the data fabric; access check with each of the first and second peripheral component endpoints via the data fabric; and address translate for each of the first and second peripheral component endpoints.

* * * * *